United States Patent
Giriyappa

(10) Patent No.: US 11,379,425 B1
(45) Date of Patent: Jul. 5, 2022

(54) OPTIMIZING SYNCHRONIZATION OF CONTENT MANAGEMENT SERVERS

(71) Applicant: Open Text Corporation, Waterloo (CA)

(72) Inventor: Venkatesh Giriyappa, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 428 days.

(21) Appl. No.: 14/132,176

(22) Filed: Dec. 18, 2013

(51) Int. Cl.
*H04L 67/568* (2022.01)
*G06F 16/27* (2019.01)
*G06F 16/178* (2019.01)
*G06F 40/205* (2020.01)

(52) U.S. Cl.
CPC .......... *G06F 16/178* (2019.01); *G06F 16/273* (2019.01); *H04L 67/2842* (2013.01); *G06F 40/205* (2020.01)

(58) Field of Classification Search
CPC ......... G06F 17/30174; G06F 17/30176; G06F 16/178; G06F 16/273; G06F 16/27; H04L 67/2842
See application file for complete search history.

(56) References Cited

U.S. PATENT DOCUMENTS

| | | | | |
|---|---|---|---|---|
| 6,182,080 B1 * | 1/2001 | Clements | ................. | G06F 16/10 707/610 |
| 6,553,409 B1 * | 4/2003 | Zhang et al. | ................. | 709/213 |
| 6,829,655 B1 * | 12/2004 | Huang | ................. | G06F 16/27 707/999.203 |
| 7,386,674 B1 * | 6/2008 | Lango | ................. | G06F 12/0862 707/999.204 |
| 9,043,567 B1 * | 5/2015 | Modukuri | ................. | G06F 16/00 711/162 |
| 9,164,702 B1 * | 10/2015 | Nesbit | ................. | G06F 16/10 |
| 2001/0047400 A1 * | 11/2001 | Coates et al. | ................. | 709/219 |
| 2004/0054800 A1 * | 3/2004 | Shah et al. | ................. | 709/231 |
| 2005/0039065 A1 * | 2/2005 | Cheung | ................. | H04N 21/4302 713/400 |
| 2007/0089110 A1 * | 4/2007 | Li | ................. | H04L 67/2847 717/178 |
| 2007/0101061 A1 * | 5/2007 | Baskaran | ................. | G06F 16/9574 711/118 |
| 2009/0234911 A1 * | 9/2009 | Khavari | ................. | G06Q 10/107 709/203 |
| 2012/0259926 A1 * | 10/2012 | Lockhart | ................. | H04L 12/5845 709/206 |
| 2013/0031060 A1 * | 1/2013 | Lowery et al. | ................. | 707/689 |
| 2013/0246901 A1 * | 9/2013 | Massand | ................. | G06F 16/00 715/229 |
| 2014/0007239 A1 * | 1/2014 | Sharpe | ................. | G06F 16/1752 726/24 |

(Continued)

*Primary Examiner* — Ashish Thomas
*Assistant Examiner* — Jedidiah P Ferrer
(74) *Attorney, Agent, or Firm* — Sprinkle IP Law Group

(57) ABSTRACT

Optimizing synchronization of content management servers is described. A caching server receives a message pointing to a synchronization file that includes multiple content synchronization messages. The caching server downloads the synchronization file based on the message. The caching server identifies multiple contents for synchronization based on the multiple content synchronization messages. The caching server synchronizes the multiple contents via a connection to a content server.

26 Claims, 3 Drawing Sheets

(56) References Cited

U.S. PATENT DOCUMENTS

| | | | |
|---|---|---|---|
| 2014/0025628 A1* | 1/2014 | Tse | G06F 17/30011 |
| | | | 707/609 |
| 2014/0068401 A1* | 3/2014 | Kirigin | G06F 17/30884 |
| | | | 715/205 |
| 2014/0108474 A1* | 4/2014 | David | G06F 17/30174 |
| | | | 707/827 |
| 2014/0250067 A1* | 9/2014 | Calkowski et al. | 707/624 |
| 2014/0359423 A1* | 12/2014 | Doan | G06F 17/3089 |
| | | | 715/234 |
| 2015/0149407 A1* | 5/2015 | Abbott et al. | 707/610 |

\* cited by examiner

OPTIMIZING SYNCHRONIZATION OF CONTENT MANAGEMENT SERVERS

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to generate new filtering, routing and search pathways, and retention-rule decisions. An enterprise content management system provides access to data about email and instant messaging, which may be used in business decisions. The audit trail generated by an enterprise content management system enhances document security, and provides metrics to help measure productivity and identify efficiency.

An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
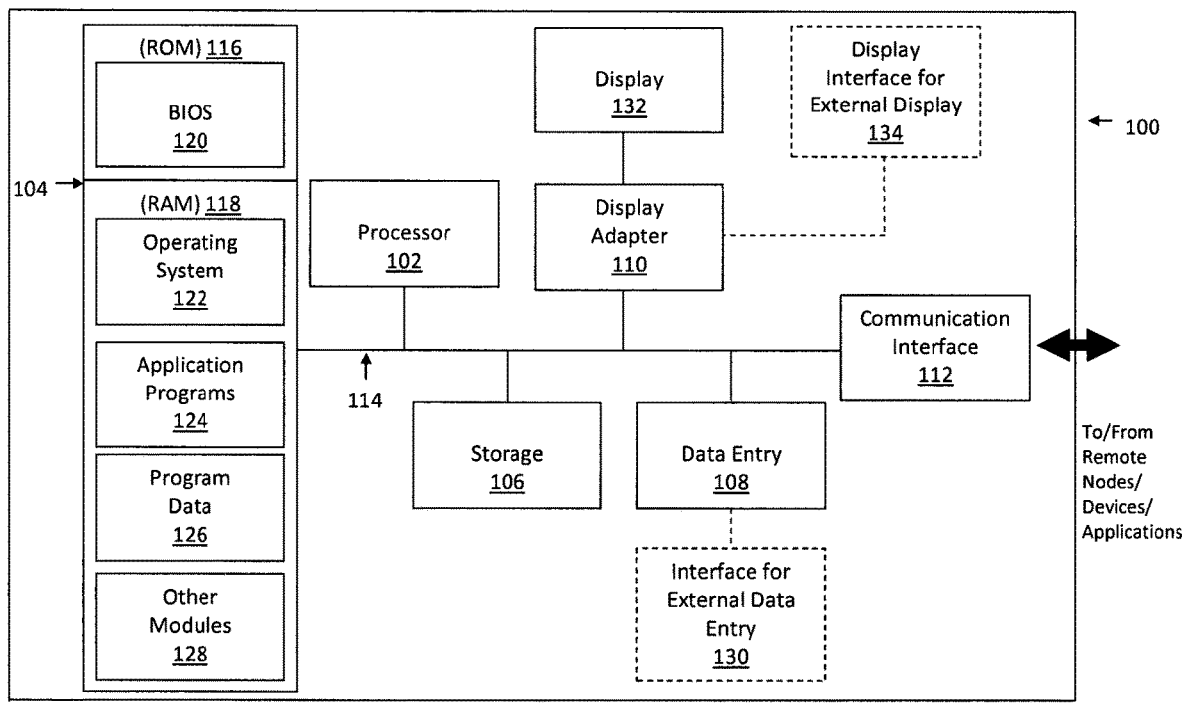
FIG. 1 is a block diagram illustrating an example hardware device in which the subject matter may be implemented.

An enterprise content management system's primary content server may cache content in multiple caching servers at distributed geographical locations, which may be referred to as branch office caching servers. This enables client computers that are located closer to the multiple caching servers to access the content faster than if all of the client access requests were handled by the primary content server. Whenever new content is added into any of the content servers, the enterprise content management system synchronizes any changes to the content to the primary content server and/or all of the multiple caching servers so that the latest content is available through any of the multiple caching servers.

Typically, a scheduler periodically generates synchronization messages based on any changes identified in content metadata stored by the primary content server, generating a separate synchronization message for all of the new content to be synchronized. Generating a separate synchronization message for each content update and sending them across a network to the messaging server for forwarding to all of the caching servers is a very expensive operation. It utilizes a significant amount of network bandwidth and causing a significant load for the primary content server.

The primary content server generates a separate digital signature based on the content updates and includes the separate digital signature in the synchronization message for each content update to be synchronized. A messaging server forwards the synchronization messages, including the separate digital signatures, to the corresponding caching servers. Each of the multiple caching servers validates the separate digital signature of each message and processes each of the separate digital signatures separately. When the number of synchronization messages is significantly large, generating the separate digital signatures and validating these separate digital signatures in both the caching servers and the primary content server can become an expensive operation for each synchronization message.

Each of the multiple caching servers makes a separate connection to the primary content server for each synchronization message to request synchronization of the content based on the synchronization messages. Again, when the number of synchronization messages is significantly large, creating a separate connection for each synchronization message may also become an expensive operation. The content server validates the separate digital signatures in each of the synchronization requests, and processes each of the separate digital signatures separately.

When a caching server that needs to be synchronized has been out of operation for a significant period of time, the primary content server continues generating synchronization messages for the caching server, including duplicate synchronization messages for the same content updates. As a result, the messaging server may become overloaded with a large backlog of synchronization messages, which may cause performance related problems. Synchronization messages that the messaging server does not process within a particular time period become expired, which may result in a messaging server becoming overloaded with a significant number of unprocessed messages. Furthermore, a caching server cannot determine whether a synchronization message is expired or not until the caching server receives the synchronization message. This means that if a scheduler generates 1,000 synchronization messages while the caching server is out of operation, then the caching server will receive all 1,000 messages before determining that almost all of the 1,000 synchronization messages are expired, thereby creating a significant performance problem.

Embodiments herein enable optimizing synchronization of content management servers. A system receives a message pointing to a synchronization file that includes multiple content synchronization messages. For example, an optimizer tool receives a wrapper message that points to a synchronization file of 10 content synchronization messages. The system downloads the synchronization file based on the message. For example, the optimizer tool downloads the synchronization file pointed to by the wrapper message. The system identifies multiple contents for synchronization based on the multiple content synchronization messages. For example, a caching server parses the synchronization file to identify the 10 content synchronization messages, which identify the content the caching server stores that should be synchronized. The system synchronizes the multiple contents via a connection to a content server. For example, the optimizer tool makes a single connection to the primary content server to synchronize the 10 content updates corresponding to the 10 content synchronization messages, thereby conserving system resources by making fewer connections.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for optimizing synchronization of content management servers.

Figure 2:
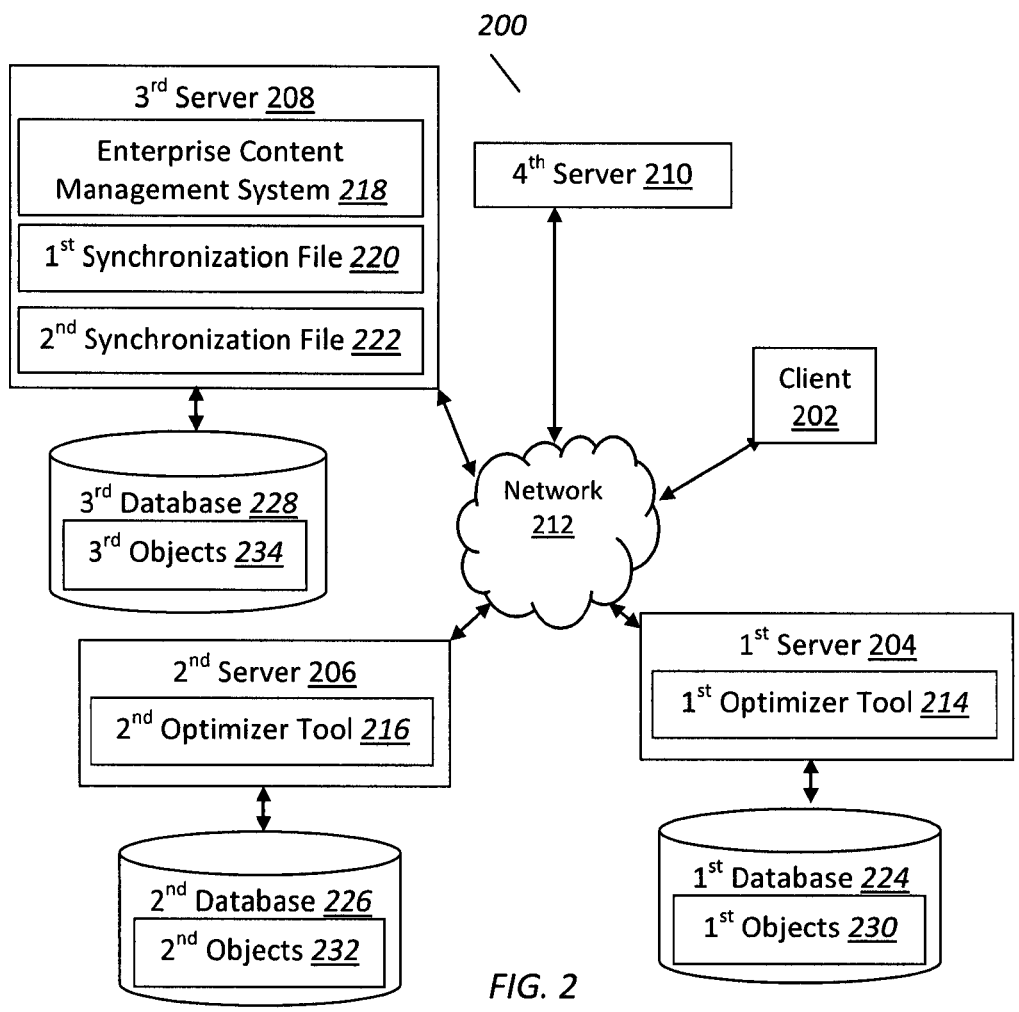
FIG. 2 illustrates a block diagram of an example system for optimizing synchronization of content management servers, under an embodiment.

FIG. 2 illustrates a block diagram of a system that implements optimizing synchronization of content management servers, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204, a second server 206, a third server 208, and a fourth server 210 that are provided by a hosting company. The client 202 and the servers 204-210 communicate via a network 212. The first server 204 includes a first optimizer tool 214, and may be referred to as a first caching server 204, while the second server 206 includes a second optimizer tool 216, and may be referred to as a second caching server 206. The third server 208 includes an enterprise content management system 218, a first synchronization file 220, and a second synchronization file 222, and may be referred to as a primary content server 208, while the fourth server 210 may be referred to as a messaging server 210. The first server 204 accesses a first database 224, the second server 204 accesses a second database 226, and the third server 208 accesses a third database 228. The databases 224-228 may be referred to as Documentum® databases 224-228, which are provided by EMC® Corporation. Alternatively, the databases 224-228 may be some other database known in the art.

The first database 224 stores first objects 230, the second database 226 stores second objects 232, and the third database 228 stores third objects 234. The client 202 and the servers 204-210 may each be substantially similar to the system 100 depicted in FIG. 1. Although FIG. 2 depicts only one client 202, four servers 204-210, one network 212, two optimizer tools 214-216, one enterprise content management system 218, two synchronization files 220-222, three databases 224-228, and one of each of the system elements 230-234, the system 200 may include any number of clients 202, servers 204-210, networks 212, optimizer tools 214-216, enterprise content management systems 218, synchronization files 220-222, databases 224-228, and each of the system elements 230-234.

The primary content server 208 processes synchronization messages collectively, which may be based on instructions from the first optimizer tool 214. This eliminates the need to send a separate synchronization message to a caching server for each instance that a scheduler executes and identifies new content updates for the caching server. Processing synchronization messages collectively reduces consumption of system resources. The primary content server 208 stores each of the synchronization messages for the first caching server 204 in the first synchronization file 220 and creates a first wrapper message that points to the first synchronization file 220 after a specified number of synchronization messages are stored in the first synchronization file 220 or a specified amount of time has passed. Subsequently, the primary content server 208 sends the first wrapper message to the messaging server 210, which forwards the first wrapper message to the first caching server 204. Sending only a single wrapper message to the messaging server 210 significantly reduces the amount of messages sent to the messaging server 210, thereby reducing the load on the messaging server 210 and conserving system resources.

Similarly, the primary content server 208 stores each of the synchronization messages for the second caching server 206 in the second synchronization file 222, and processes the second synchronization file 222 in a manner similar to how the primary content server 208 processes the first synchronization file 220, which may be based on instructions from the second optimizer tool 216.

The system 200 receives a message pointing to a synchronization file that includes multiple content synchronization messages. For example, the first optimizer tool 214 receives the first wrapper message that points to the first synchronization file 220, which stores 10 content synchronization messages. Instead of receiving a separate synchronization message from messaging servers for each content update, the first optimizer tool 214 receives only a single wrapper message, thereby conserving system resources by sending fewer messages. The first synchronization file 220 may be a simple text file which can be parsed to extract the synchronization messages. The first optimizer tool 214 may determine whether a digital signature associated with the first wrapper message is valid.

Further, instead of generating a separate digital signature for each synchronization message, the primary content server 208 generates a single digital signature for the first synchronization file 220 that stores multiple synchronization messages, which may be based on instructions from the first optimizer tool 214. Generating fewer digital signatures conserves system resources. Since the primary content server 208 generates a single digital signature for multiple synchronization messages, the primary content server 208 excludes content identifiers when generating the digital signature, as the digital signature will no longer have a one-to-one correspondence with content updates. The first optimizer tool 214 may also determine whether the first wrapper message is expired.

In another example, the second optimizer tool 216 receives a second wrapper message that points to the second synchronization file 222, which stores 100 content synchronization messages. To avoid a situation where the messaging server 210 becomes overloaded with 100 content synchronization messages for each caching server that is out of operation for a significant period of time, the messaging server 210 stores only a single wrapper message for each caching server that is out of operation for a significant period of time, thereby reducing the possibility of overloading the messaging server 210.

The system 200 downloads a synchronization file based on a message. For example, the first optimizer tool 214 downloads the first synchronization file 220 pointed to by the first wrapper message. The first optimizer tool 214 may download the first synchronization file 220 only if the single digital signature associated with the first wrapper message is valid, thereby avoiding the need to verify the validity of a separate digital signature for each synchronization message. This conserves system resources by verifying the validity of fewer digital signatures. In addition, the first optimizer tool 214 may download the first synchronization file 220 only if the timestamp for the first wrapper message is not expired, rather than having to determine whether each synchronization message is expired. Again, this conserves system resources by determining whether fewer messages are expired. In another example, the second optimizer tool 216 downloads the second synchronization file 222 pointed to by the second wrapper message.

The system 200 identifies multiple contents for synchronization based on multiple content synchronization messages. For example, the first caching server 204 parses the first synchronization file 220 to identify the 10 content synchronization messages, which identify the first objects 230 that the first caching server 204 stores which should be synchronized. In another example, the second caching server 206 parses the second synchronization file 222 to identify the 100 content synchronization messages, which identify the second objects 232 that the second caching server 206 stores which should be synchronized.

The system 200 synchronizes multiple contents via a single connection to a content server. For example, the first optimizer tool 214 makes a single connection to the primary content server 208 for the first caching server 204 to synchronize the 10 content updates for the first objects 230 that the first caching server 204 stores which should be synchronized. The first optimizer tool 214 makes a single connection to synchronize the multiple content updates instead of making a separate connection to a primary content server for synchronizing each content update. This will also conserve system resources by making fewer connections.

The first optimizer tool 214 sends the single digital signature previously received with the first wrapper message when requesting to synchronize the 10 content updates for the first objects 230. This makes it unnecessary to send a separate digital signature when requesting to synchronize each content update so that system sends fewer digital signatures. As a result, the primary content server 208 validates only a single digital signature for the 10 content updates for the first objects 230 as opposed to validating a separate digital signature for each content update.

In another example, the second optimizer tool 216 makes a single connection to the primary content server 208 for the second caching server 206 to synchronize the 100 content updates for the second objects 232 that the second caching server 206 stores which should be synchronized. If synchronizing content fails at some point during the content synchronization process, a caching server can identify which content still needs to be synchronized, and reestablish a connection with a primary content server, which does not need to validate the digital signature that the caching server sent with the original synchronization request. For example, the synchronization process fails after the primary content server 208 downloaded the first 4 content updates corresponding to the first 4 synchronization messages. Then the first caching server 204 reestablishes a connection with the primary content server 208, requests the last 6 content updates corresponding to the last 6 synchronization messages, and the primary content server 208 downloads the last 6 content updates corresponding to the last 6 synchronization messages, without re-validating the digital signature that the first caching server 204 sent with the original synchronization request.

The optimizer tools 214-216 conserve system resources by making fewer connections, and by enabling fewer sending of messages, fewer generations of digital signatures, fewer sending of digital signatures, fewer verifications of digital signatures, and fewer determinations of whether messages are expired. The optimizer tools 214-216 reduce the loads on the caching servers 204-206, the primary content server 208, and the messaging server 210.

Figure 3:
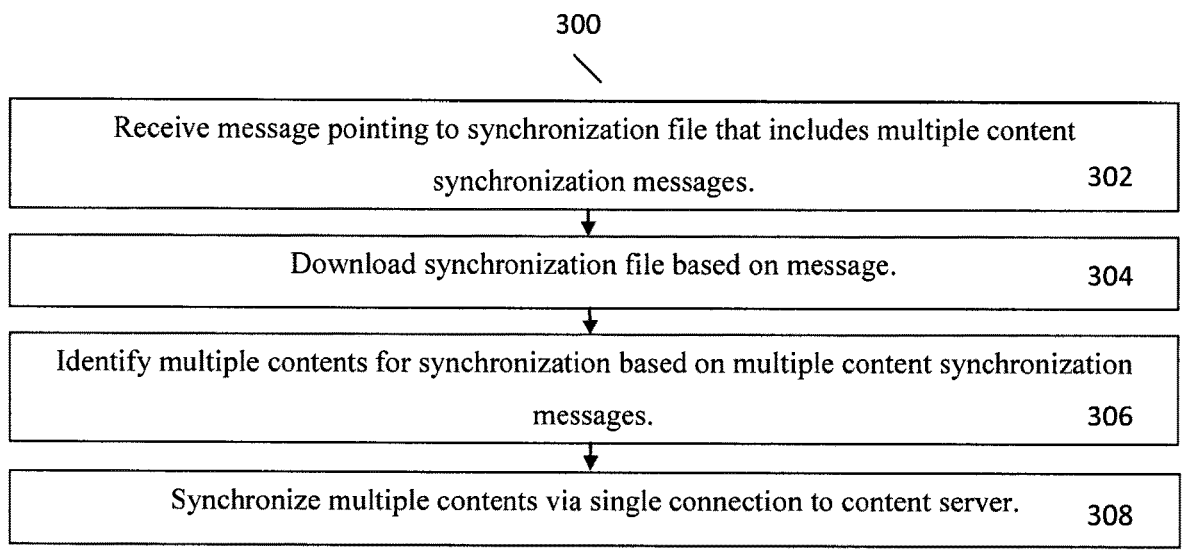
FIG. 3 is a flowchart that illustrates an example method for optimizing synchronization of content management servers, under an embodiment.

FIG. 3 is a flowchart that illustrates a method for optimizing synchronization of content management servers.

Flowchart 300 illustrates method acts illustrated as flowchart blocks for certain steps involved in and/or between the client 202 and/or the servers 204-210 of FIG. 2. In some example embodiments, the method illustrated by the flowchart 300 may be executed by a single server, such as server 204.

A message is received pointing to a synchronization file that includes multiple content synchronization messages, block 302. For example, the first optimizer tool 214 receives the first wrapper message that points to the first synchronization file 220, which stores 10 content synchronization messages.

A synchronization file is downloaded based on a message, block 304. For example, the first optimizer tool 214 downloads the first synchronization file 220 pointed to by the first wrapper message.

Multiple contents are identified for synchronization based on multiple content synchronization messages, block 306. For example, the first caching server 204 parses the first synchronization file 220 to identify the 10 content synchronization messages, which identify the first objects 230 that the first caching server 204 stores which should be synchronized.

Multiple contents are synchronized via a connection to a content server, block 308. For example, the first optimizer tool 214 makes a single connection to the primary content server 208 for the first caching server 204 to synchronize the 10 content updates for the first objects 230 that the first caching server 204 stores which should be synchronized.

Although FIG. 3 depicts the blocks 302-308 occurring in a specific order, the blocks 302-308 may occur in another order. Embodiments herein enable optimizing synchronization of content management servers. The optimizer tools 214-216 conserve system resources by making fewer connections, and by enabling fewer sending of messages, fewer generations of digital signatures, fewer sending of digital signatures, fewer verifications of digital signatures, and fewer determinations of whether messages are expired. The optimizer tools 214-216 reduce the loads on the caching servers 204-206, the primary content server 208, and the messaging server 210.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for optimizing synchronization of a caching server, the system comprising:
   the caching server, having a processor; and
   a non-transitory computer readable medium storing one or more sequences of instructions that are executable by the processor to:
   receive, by the caching server, a message pointing to a synchronization file stored on a content server, the synchronization file comprising a plurality of separate content synchronization messages, wherein each of the content synchronization messages identifies a corresponding update which has been made to content stored on the content server and wherein for each of the content synchronization messages, the corresponding update to the content stored on the content server is to be synchronized to corresponding content on the caching server;
   after receiving the message pointing to the synchronization file, download, by the caching server from the content server, the synchronization file based on the message;
   parse, by the caching server, the downloaded synchronization file, thereby extracting the plurality of content synchronization messages from the downloaded synchronization file;
   for each of the extracted content synchronization messages, identify, by the caching server, the content previously stored by the caching server corresponding to the extracted content synchronization message; and
   for each of the extracted content synchronization messages, synchronize, by the caching server via the same connection to the content server, the identified content on the caching server corresponding to the extracted content synchronization message bar applying the corresponding update extracted from the content synchronization message.

2. The system of claim 1, wherein receiving the message comprises determining whether the message is expired; and
   wherein downloading the synchronization file comprises downloading the synchronization file in response to a determination that the message is not expired.

3. The system of claim 1, wherein receiving the message pointing to the synchronization file comprises determining whether a digital signature associated with the message pointing to the synchronization file is valid;
   wherein downloading the synchronization file comprises downloading the synchronization file in response to a determination that the digital signature associated with the message pointing to the synchronization file is valid; and
   wherein the identified content corresponding to each extracted content synchronization message is synchronized in response to the determination that the digital signature associated with the message pointing to the synchronization file is valid.

4. The system of claim 3, wherein the digital signature is generated based on excluding a plurality of content identifiers.

5. The system of claim 1, wherein synchronizing the plurality of contents comprises:
sending a digital signature associated with the message; and
synchronizing the plurality of contents in response to a determination by the content server that the digital signature associated with the message is valid.

6. The system of claim 5, wherein the digital signature is generated based on excluding a plurality of content identifiers.

7. The system of claim 1, wherein at least some of the plurality of contents for synchronization is synchronized to the content server by another caching server.

8. The system of claim 1, wherein the instructions are executable by the processor to establish a single connection between the caching server and the content server,
wherein synchronizing, by the caching server, the identified plurality of contents includes synchronizing, by the caching server, the identified plurality of contents via the established single connection to the content server.

9. The system of claim 1, wherein the plurality of content synchronization messages comprise content synchronization messages automatically generated for updates to content stored by the content server.

10. A computer-implemented method for optimizing synchronization of a caching server, the method comprising:
receiving, by the caching server, a message pointing to a synchronization file stored on a content server, the synchronization file comprising a plurality of separate content synchronization messages, wherein each of the content synchronization messages identifies a corresponding update which has been made to content stored on the content server and wherein for each of the content synchronization messages, the corresponding update to the content stored on the content server is to be synchronized to corresponding content on the caching server;
after receiving the message pointing to the synchronization file, downloading, by the caching server from the content server, the synchronization file based on the message;
parsing, by the caching server, the downloaded synchronization file, thereby extracting the plurality of content synchronization messages from the downloaded synchronization file;
for each of the extracted content synchronization messages, identifying, by the caching server, the content previously stored by the caching server for synchronization corresponding to the extracted content synchronization message; and
for each of the extracted content synchronization messages, synchronizing, by the caching server via the same connection to the content server, the identified content on the caching server corresponding to the extracted content synchronization message by applying the corresponding update extracted from the content synchronization message.

11. The computer-implemented method of claim 10, wherein receiving the message comprises determining whether the message is expired; and
wherein downloading the synchronization file comprises downloading the synchronization file in response to a determination that the message is not expired.

12. The computer-implemented method of claim 10, wherein receiving the message pointing to the synchronization file comprises determining whether a digital signature associated with the message pointing to the synchronization file is valid;
wherein downloading the synchronization file comprises downloading the synchronization file in response to a determination that the digital signature associated with the message pointing to the synchronization file is valid; and
wherein the identified content corresponding to each extracted content synchronization message is synchronized in response to the determination that the digital signature associated with the message pointing to the synchronization file is valid.

13. The computer-implemented method of claim 12, wherein the digital signature is generated based on excluding a plurality of content identifiers.

14. The computer-implemented method of claim 10, wherein synchronizing the plurality of contents comprises:
sending a digital signature associated with the message; and
synchronizing the plurality of contents in response to a determination by the content server that the digital signature associated with the message is valid.

15. The computer-implemented method of claim 14, wherein the digital signature is generated based on excluding a plurality of content identifiers.

16. The computer-implemented method of claim 10, further comprising establishing a single connection between the caching server and the content server,
wherein synchronizing, by the caching server, the identified plurality of contents includes synchronizing, by the caching server, the identified plurality of contents via the established single connection to the content server.

17. The computer-implemented method of claim 10, wherein the plurality of content synchronization messages comprise content synchronization messages automatically generated for updates to content stored by the content server.

18. A computer program product, comprising a non-transitory computer-readable medium having a computer-readable program code embodied therein to be executed by one or more processors, the program code including instructions to:
receive, by a caching server, a message pointing to a synchronization file stored on a content server, the synchronization file comprising a plurality of separate content synchronization messages, wherein each of the content synchronization messages identifies a corresponding update which has been made to content stored on the content server and wherein for each of the content synchronization messages, the corresponding update to the content stored on the content server is to be synchronized to corresponding content on the caching server;
after receiving the message pointing to the synchronization file, download, by the caching server from the content server, the synchronization file based on the message;
parse, by the caching server, the downloaded synchronization file, thereby extracting the plurality of content synchronization messages from the downloaded synchronization file;

for each of the extracted content synchronization messages, identify, by the caching server, the content previously stored by the caching server for synchronization corresponding to the extracted content synchronization message; and for each of the extracted content synchronization messages, synchronize, by the caching server via the same connection to the content server, the identified content on the caching server corresponding to the extracted content synchronization message by applying the corresponding update extracted from the content synchronization message.

19. The computer program product of claim 18, wherein receiving the message comprises determining whether the message is expired; and wherein downloading the synchronization file comprises downloading the synchronization file in response to a determination that the message is not expired.

20. The computer program product of claim 18, wherein receiving the message pointing to the synchronization file comprises determining whether a digital signature associated with the message pointing to the synchronization file is valid;

wherein downloading the synchronization file comprises downloading the synchronization file in response to a determination that the digital signature associated with the message pointing to the synchronization file is valid; and wherein the identified content corresponding to each extracted content synchronization message is synchronized in response to the determination that the digital signature associated with the message pointing to the synchronization file is valid.

21. The computer program product of claim 20, wherein the digital signature is generated based on excluding a plurality of content identifiers.

22. The computer program product of claim 18, wherein synchronizing the plurality of contents comprises:

sending a digital signature associated with the message; and synchronizing the plurality of contents in response to a determination by the content server that the digital signature associated with the message is valid.

23. The computer program product of claim 22, wherein the digital signature is generated based on excluding a plurality of content identifiers.

24. The computer program product of claim 18, wherein at least some of the plurality of contents for synchronization is synchronized to the content server by another caching server.

25. The computer program product of claim 18, wherein the program code includes instructions to establish a single connection between the caching server and the content server, wherein synchronizing, by the caching server, the identified plurality of contents includes synchronizing, by the caching server, the identified plurality of contents via the established single connection to the content server.

26. The computer program production of claim 18, wherein the plurality of content synchronization messages comprise content synchronization messages automatically generated for updates to content stored by the content server.

* * * * *